(12) United States Patent
Navarrete Michelini et al.

(10) Patent No.: US 10,515,435 B2
(45) Date of Patent: Dec. 24, 2019

(54) APPARATUS FOR UPSCALING AN IMAGE, METHOD FOR TRAINING THE SAME, AND METHOD FOR UPSCALING AN IMAGE

(71) Applicant: BOE Technology Group Co., Ltd., Beijing (CN)

(72) Inventors: Pablo Navarrete Michelini, Beijing (CN); Hanwen Liu, Beijing (CN); Xiaoyu Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/821,095

(22) Filed: Nov. 22, 2017

(65) Prior Publication Data
US 2018/0315165 A1    Nov. 1, 2018

(30) Foreign Application Priority Data
Apr. 27, 2017    (CN) .......................... 2017 1 0289664

(51) Int. Cl.
| | | |
|---|---|---|
| *G06T 3/40* | (2006.01) | |
| *G06N 3/08* | (2006.01) | |
| *G06N 3/04* | (2006.01) | |
| *G06T 1/20* | (2006.01) | |

(52) U.S. Cl.
CPC ............ *G06T 3/4046* (2013.01); *G06N 3/04* (2013.01); *G06N 3/0454* (2013.01); *G06N 3/08* (2013.01); *G06T 1/20* (2013.01); *G06T 3/4007* (2013.01); *G06T 3/4053* (2013.01)

(58) Field of Classification Search
None
See application file for complete search history.

(56) References Cited

U.S. PATENT DOCUMENTS

| | | | |
|---|---|---|---|
| 7,187,811 B2* | 3/2007 | Lin ...................... | G06T 3/4007 382/299 |
| 10,015,510 B1* | 7/2018 | Navarrete Michelini | ................... H04N 19/117 |
| 10,019,642 B1* | 7/2018 | Navarrete Michelini | ................... G06T 3/40 |
| 2014/0056517 A1 | 2/2014 | Schaschek et al. | |

(Continued)

FOREIGN PATENT DOCUMENTS

| | | |
|---|---|---|
| CN | 1750053 A | 3/2006 |
| CN | 102231264 A | 11/2011 |

(Continued)

OTHER PUBLICATIONS

"A reconfigurable interconnected filter for face recognition based on convolution neural network", by S.A. Dawwd and B.S. Mahmood, 2009 4th International Design and Test Workshop (IDT), pp. 1-6. (Year: 2009).*

(Continued)

*Primary Examiner* — James A Thompson
(74) *Attorney, Agent, or Firm* — Arent Fox LLP; Michael Fainberg

(57) ABSTRACT

The disclosure discloses an apparatus for upscaling an image, a method for training the same, and a method for upscaling an image, where a convolutional neural network circuit obtains feature images of the image, a multiplexer upscales the image by integrating every n*n feature images of an input signal into a feature image with a resolution which is n times the resolution of a feature image of the image, where n is an integer greater than 1.

18 Claims, 4 Drawing Sheets

(56) References Cited

U.S. PATENT DOCUMENTS

| | | | |
|---|---|---|---|
| 2015/0310789 A1 | 10/2015 | Heide et al. | |
| 2015/0310798 A1 | 10/2015 | Heide et al. | |
| 2017/0169327 A1* | 6/2017 | Nestler | G06N 3/04 |
| 2017/0323196 A1* | 11/2017 | Gibson | G06N 3/04 |
| 2018/0101957 A1* | 4/2018 | Talathi | G06T 7/10 |
| 2018/0129893 A1* | 5/2018 | Son | G06K 9/00979 |
| 2018/0150740 A1* | 5/2018 | Wang | G06T 7/11 |
| 2018/0197067 A1* | 7/2018 | Mody | G06F 7/5443 |
| 2018/0211157 A1* | 7/2018 | Liu | G06K 9/6232 |
| 2019/0005619 A1* | 1/2019 | Michelini | G06T 3/40 |

FOREIGN PATENT DOCUMENTS

| | | |
|---|---|---|
| CN | 104200447 A | 12/2014 |
| CN | 105049831 A | 11/2015 |
| CN | 105120130 A | 12/2015 |
| CN | 204948182 U | 1/2016 |
| CN | 105787898 A | 7/2016 |

OTHER PUBLICATIONS

"Image Super-Resolution Based on Convolution Neural Networks Using Multi-Channel Input", by Gwang-Young Youm, Sung-Ho Bae, and Munchurl Kim, 2016 IEEE 12th Image, Video, and Multidimensional Signal Processing Workshop (IVMSP), Jul. 2016, pp. 1-5. (Year: 2016).*

"Face Hallucination via Convolution Neural Network", by Hui Nie, Yao Lu, and Javaria Ikram, 2016 IEEE 28th International Conference on Tools with Artificial Intelligence (ICTAI), Nov. 2016, pp. 485-489. (Year: 2016).*

"Convolutional neural networks based image resampling with noisy training set", by Andrey Nasonov, Konstantin Chesnakov, and Andrey Krylov, 2016 IEEE 13th International Conference on Signal Processing (ICSP), Nov. 2016, pp. 62-66. (Year: 2016).*

ISR for PCT/CN2017/092593 dated Sep. 28, 2017.

* cited by examiner

APPARATUS FOR UPSCALING AN IMAGE, METHOD FOR TRAINING THE SAME, AND METHOD FOR UPSCALING AN IMAGE

CROSS-REFERENCE TO RELATED APPLICATION

This Application claims priority to Chinese Patent Application No. 201710289664.8, filed on Apr. 27, 2017, the content of which is incorporated by reference in the entirety.

FIELD

The present disclosure relates to the field of processing an image signal, and particularly to an apparatus for upscaling an image, a method for training the same, and a method for upscaling an image.

DESCRIPTION OF THE RELATED ART

In the related art, an image is typically upscaled by a standard upscaling scheme, e.g., bi-cubic, linear, etc., where upscaling an image refers to increase the resolution of an image.

However, there are a considerable number of data operations, and the upscaling factor may not be adjusted flexibly, in the existing apparatus for upscaling an image.

SUMMARY

In one aspect, an embodiment of the disclosure provides an apparatus for upscaling an image, the apparatus for upscaling an image including at least one first convolutional neural network circuit and at least one multiplexer, which are connected in cascade, wherein: one of the at least one first convolutional neural network circuit is located at a first level of the apparatus for upscaling an image, and a signal input terminal of the first convolutional neural network circuit located at the first level of the apparatus for upscaling an image is served as a signal input terminal of the apparatus for upscaling an image; one of the at least one multiplexer is located at a last level of the apparatus for upscaling an image, and a signal output terminal of the multiplexer located at the last level of the apparatus for upscaling an image is served as a signal output terminal of the apparatus for upscaling an image; and each multiplexer has a signal input terminal connected with a signal output terminal of one of the at least one first convolutional neural network circuit, or with a signal output terminal of another multiplexer; each first convolutional neural network circuit is configured to convert an image of an input signal input to the first convolutional neural network circuit into a plurality of feature images, and to output the feature images; each multiplexer is configured to integrate every n*n feature images among feature images of an input signal input to the multiplexer into a feature image with a resolution which is n times a resolution of a feature image of the input signal input to the multiplexer, and to output the feature image, wherein the number of feature images of the input signal input to the multiplexer is a multiple of n*n, and n is an integer greater than 1.

In another aspect, an embodiment of the disclosure provides a display device including an apparatus for upscaling an image, the apparatus for upscaling an image including at least one first convolutional neural network circuit and at least one multiplexer, which are connected in cascade, wherein: one of the at least one first convolutional neural network circuit is located at a first level of the apparatus for upscaling an image, and a signal input terminal of the first convolutional neural network circuit located at the first level of the apparatus for upscaling an image is served as a signal input terminal of the apparatus for upscaling an image; one of the at least one multiplexer is located at a last level of the apparatus for upscaling an image, and a signal output terminal of the multiplexer located at the last level of the apparatus for upscaling an image is served as a signal output terminal of the apparatus for upscaling an image; and each multiplexer has a signal input terminal connected with a signal output terminal of one of the at least one first convolutional neural network circuit, or with a signal output terminal of another multiplexer; each first convolutional neural network circuit is configured to convert an image of an input signal input to the first convolutional neural network circuit into a plurality of feature images, and to output the feature images; each multiplexer is configured to integrate every n*n feature images among feature images of an input signal input to the multiplexer into a feature image with a resolution which is n times a resolution of a feature image of the input signal input to the multiplexer, and to output the feature image, wherein the number of feature images of the input signal input to the multiplexer is a multiple of n*n, and n is an integer greater than 1.

In still another aspect, an embodiment of the disclosure provides a method for training the apparatus above for upscaling an image according to the embodiment of the disclosure, the method including: initializing respective parameters of the apparatus for upscaling an image; taking an original image signal as an output signal of the apparatus for upscaling an image, taking an image signal which is obtained by downscaling the original image signal, as an input signal of the apparatus for upscaling an image, and adjusting the respective parameters of the apparatus for upscaling an image so that an image signal which is obtained by upscaling the downscaled image signal via the respective adjusted parameters is the same as the original image signal.

In still another aspect, an embodiment of the disclosure provides a method for upscaling an image using the apparatus above for upscaling an image according to the embodiment of the disclosure, the method including: converting, by each first convolutional neural network circuit, an image of an input signal input to the first convolutional neural network circuit into a plurality of feature images, and outputting the feature images; and integrating, by each multiplexer, every n*n feature images among feature images of an input signal input to the multiplexer into a feature image with a resolution which is n times a resolution of a feature image of the input signal input to the multiplexer, and outputting the feature image, wherein the number of feature images of the input signal input to the multiplexer is a multiple of n*n, and n is an integer greater than 1.

BRIEF DESCRIPTION OF THE DRAWINGS

In order to make the technical solutions according to the embodiments of the present disclosure more apparent, the drawings to which a description of the embodiments refers will be briefly introduced below, and apparently the drawings to be described below are merely illustrative of some of the embodiments of the present disclosure, and those ordinarily skilled in the art can derive from these drawings other drawings without any inventive effort.

DETAILED DESCRIPTION OF THE EMBODIMENTS

Figure 1:
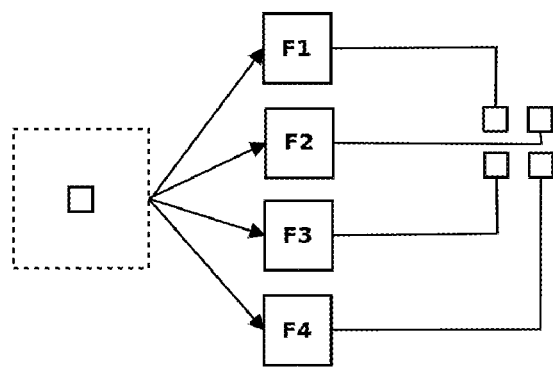
FIG. 1 is a schematic diagram of 2× upscaling scheme in the related art.

In the related art, an image is typically upscaled by a standard upscaling scheme, e.g., bi-cubic, linear, etc. As illustrated in FIG. 1, which illustrates a 2× upscaling scheme, four different filters F1, F2, F3, and F4 are applied to respective pixels of an input image (and their adjacent pixels) so that each filter produces one of the four pixels of an output image, and this process can be seen as applying four filters (convolutions) to the input image and then interleaving or multiplexing the outputs to create a single output image with doubled width and height.

However, when using the standard upscaling scheme to increase the resolution of an image, there are a considerable number of data operations, and the upscaling factor may not be adjusted flexibly, in the apparatus for upscaling an image.

A convolutional neural network is a kind of artificial neural network, and has become a research focus in the field of voice analysis and image recognition. Its weight sharing network structure makes it more like a biological neural network to thereby lower the complexity of a network model, and reduce the number of weights. This advantage becomes more pronounced in a multi-dimension image input to the network in that the image can be input directly to the network to thereby avoid complex feature extraction and data reconstruction processes in a traditional recognition algorithm. The convolutional neural network is a multi-level perceiver designed specially to recognize a two-dimension shape, and this network structure is highly invariable with translation, scaling, inclination, or other forms of deformation.

Based upon high invariability of the convolutional neural network with a two-dimension shape, i.e., an image, the embodiments of the disclosure provide an apparatus for upscaling an image, a method for training the same, and a method for upscaling an input image using the trained apparatus for upscaling an image. The image can be upscaled in the apparatus over a convolutional neural network to thereby convert in effect the image at a low resolution into an image at a high resolution without losing information of the image.

Particular implementations of the apparatus for upscaling an image, the method for training the same, and the method for upscaling an image according to the embodiments of the disclosure will be described below in details with reference to the drawings.

An embodiment of the disclosure provides an apparatus for upscaling an image as illustrated in FIG. 2A to FIG. 2D, where the apparatus includes: at least one first Convolutional Network (CN) circuit and at least one multiplexer (can also be called a Multiplexer Layer, ML), which are connected in cascade, where: one of the at least one first convolutional neural network circuit is located at a first level of the apparatus, and a signal input terminal of the first convolutional neural network circuit located at the first level of the apparatus is served as a signal input terminal of the apparatus; one of the at least one multiplexer is located at a last level of the apparatus, and a signal output terminal of the multiplexer located at the last level of the apparatus is served as a signal output terminal of the apparatus; and each multiplexer has a signal input terminal connected with a signal output terminal of one of the at least one first convolutional neural network circuit, or with a signal output terminal of another multiplexer.

Each first convolutional neural network circuit is configured to convert an image of an input signal input to the first convolutional neural network circuit into a plurality of feature images, and to output the feature images to a corresponding multiplexer.

Each multiplexer is configured to integrate every n*n feature images among feature images of an input signal input to the multiplexer into a feature image with a resolution which is n times a resolution of a feature image of the input signal input to the multiplexer, and to output the feature image, where the number of feature images of the input signal input to the multiplexer is a multiple of n*n, and n is an integer greater than 1.

In the apparatus above for upscaling an image according to the embodiment of the disclosure, the multiplexer upscales the image by integrating every n*n feature images of the input signal into a feature image with a resolution which is n times the resolution of a feature image of the input signal, and the multiplexer upscales the image by recording information of the respective feature images of the input signal into the generated feature image without losing any information, so after the image passes one multiplexer with an upscaling factor n, the resolution of the image can be increased by a factor n. Furthermore more than one multiplexer can be arranged in the apparatus for upscaling an image to upscale the image sequentially, and each multiplexer can perform the function of upscaling the image by a separate factor, so that the apparatus can adjust the upscaling factor flexibly as needed, thus resulting in an upscaling apparatus applicable with a variety of upscaling factors. Furthermore since each multiplexer reduces the number of feature images to be output by the multiplexer, while increasing the resolution of the feature image by a factor n, the size of an input signal to the next level of multiplexer or the next level of the first convolutional neural network circuit connected in cascade therewith can be reduced to thereby reduce the number of upscaling operations.

It shall be noted that if the apparatus includes a plurality of multiplexers (e.g., a number m of multiplexers) with an upscaling factor n, then the resolution of the image may be increased to a factor $n^m$ after the image is upscaled by the apparatus.

For example, if the apparatus includes two multiplexers with an upscaling factor 2×, then the resolution of the image may be increased to a factor 4× after the image passes these two multiplexers; and if the apparatus includes three multiplexers with an upscaling factor 2×, then the resolution of the image may be increased to a factor 8× after the image passes these three multiplexers.

In a particular implementation, there may be a number of particular implementations of the apparatus above for upscaling an image according to a desirable upscaling factor. For example, one multiplexer can be arranged as illustrated in FIG. 2A, or two multiplexers can be arranged as illustrated in FIG. 2B and FIG. 2C, or three multiplexers can be arranged as illustrated in FIG. 2D, in the apparatus above for upscaling an image according to the embodiment of the disclosure dependent upon a desirable upscaling factor.

Figure 2A:
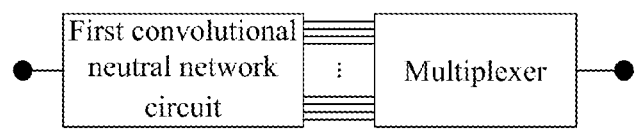
FIG. 2A to FIG. 2E are schematic structural diagrams respectively of an apparatus for upscaling an image according to embodiments of the disclosure.
Figure 2B:
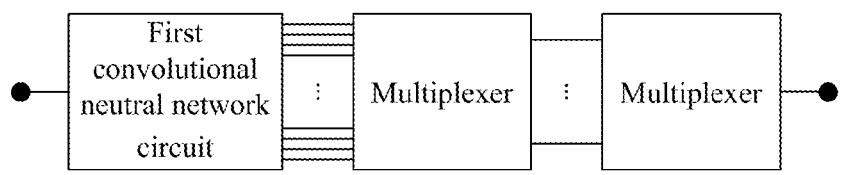
Figure 2C:
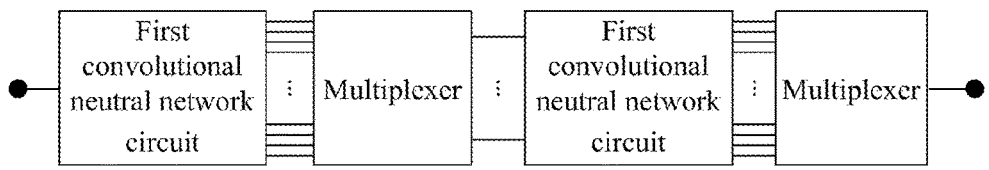
Figure 2D:
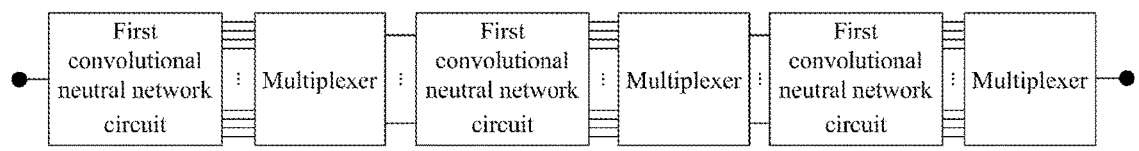

In some embodiments, when the desirable upscaling factor is generally an upscaling factor of 2×, 3×, 5×, or another prime number, the apparatus above for upscaling an image according to the embodiment of the disclosure includes one first convolutional neural network circuit, and one multiplexer configured to upscale the feature images by a corresponding upscaling factor 2×, 3×, or 5×, as illustrated in FIG. 2A; when the desirable upscaling factor is 4×, the apparatus above for upscaling an image according to the embodiment of the disclosure can include two multiplexers with an upscaling factor 2× as illustrated in FIG. 2B and FIG. 2C; when the desirable upscaling factor is 8×, the apparatus above for upscaling an image according to the embodiment of the disclosure can include three multiplexers with an upscaling factor 2× as illustrated in FIG. 2D; and so on. When the desirable upscaling factor is larger, there are also a corresponding larger number of multiplexers to be required, and there are also a corresponding larger number of data operations to be performed by the apparatus, so that in some embodiments, there are generally two or three multiplexers arranged to upscale the image twice or three times in the apparatus above for upscaling an image according to the embodiment of the disclosure.

In some embodiments, when a plurality of multiplexers are arranged in the apparatus above for upscaling an image according to the embodiment of the disclosure, in order to enable each multiplexer to upscale high-quality feature images into a high-quality feature image with a resolution which is n times the resolution of a feature image input thereto, generally a signal input terminal of each respective multiplexer is connected with a signal output terminal of a first convolutional neural network circuit as illustrated in FIG. 2C and FIG. 2D, and the first convolutional neural network circuit firstly obtains feature images, and then inputs them to the signal input terminal of the corresponding multiplexer, that is, the first convolutional neural network circuits and the multiplexers are arranged in pairs in the apparatus for upscaling an image.

In some embodiments, when a plurality of multiplexers are arranged in the apparatus above for upscaling an image according to the embodiment of the disclosure, upscaling factors of the respective multiplexers may or may not be the same. In some embodiments, when there are a plurality of multiplexers, generally the upscaling factors n of the respective multiplexers are set to the same, and if there is a smaller upscaling factor of each multiplexer, then there will be a smaller number of operations thereof, and a better upscaling effect thereof. Accordingly if the desirable upscaling factor is larger, then generally the image will be upscaled repeatedly, and the upscaling factor n of each multiplexer will be generally set to 2, 3, 5, 7, or another prime number, for example. In some embodiments, the upscaling factor n of each multiplexer is generally set to 2.

Figure 2E:
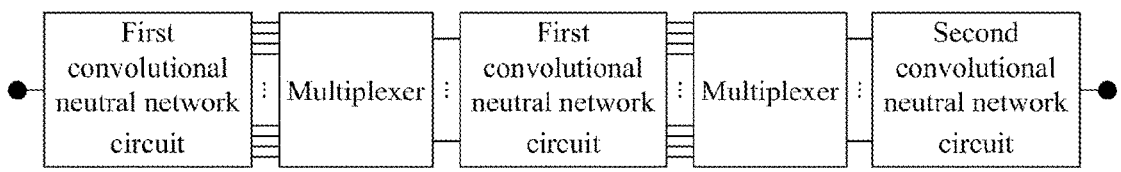

In some embodiments, the apparatus above for upscaling an image according to the embodiment of the disclosure further includes a second convolutional neural network circuit, as illustrated in FIG. 2E, wherein a signal input terminal of the second convolutional neural network circuit is connected with the signal output terminal of the multiplexer located at the last level of the apparatus, and a signal output terminal of the second convolutional neural network circuit is served as the signal output terminal of the apparatus. The second convolutional neural network circuit is configured to optimize a feature image of an output signal of the multiplexer located at the last level of the apparatus. Before the last level of multiplexer outputs the resulting upscaled feature image, the second convolutional neural network circuit can enhance the quality of the output image as needed to thereby improve the quality of the output image.

In some embodiments, in the apparatus above for upscaling an image according to the embodiment of the disclosure, each first convolutional neural network circuit and each second convolutional neural network circuit can include at least one convolution layer including a plurality of filter circuits. The number of convolution layers in each first convolutional neural network circuit and each second convolutional neural network circuit can be set as needed, and the numbers of filter circuits in the respective convolution layers may or may not be the same. In some embodiments, in order to optimize parameters of the apparatus, the number of convolution layers in each convolutional neural network circuit is typically set no greater than 10.

The apparatus above for upscaling an image according to the embodiment of the disclosure will be described below by way of an example in which the image is upscaled by a factor 4× using two 2× multiplexer in the structure illustrated in FIG. 2E.

In some embodiments, the first convolutional neural network circuit located at the first level of the apparatus includes four convolution layers, each convolution layer includes 128 filter circuits, and each filter circuit includes a number of 3*3 filters, where the filter at the position [1, 1] is defined as a central pixel. After an image of an input signal passes the first convolution layer, 128 feature images are generated and output to the next convolution layer until the last convolution layer outputs 128 feature images to the next level (the second level) of multiplexer.

The second level of multiplexer receives the 128 feature images transmitted by the first level of first convolutional neural network circuit, and then integrates every four feature images among the input feature images into a feature image with a resolution which is four times the resolution of a feature image from the first level of first convolutional neural network circuit, that is, the respective 128 input feature images pass the second level of multiplexer, and then 32 feature images are output to the next level (the third level) of first convolutional neural network circuit.

The third level of first convolutional neural network circuit includes four convolution layers, each convolution layer includes 32 filter circuits, and each filter circuit includes a number of 3*3 filters, where the filter at the position [1, 1] is defined as a central pixel. After the image of the input signal passes the first convolution layer, 32 feature images are generated and output to the next convolution layer until the last convolution layer outputs 32 feature images to the next level (the fourth level) of multiplexer.

The fourth level of multiplexer receives the 32 feature images transmitted by the third level of first convolutional neural network circuit, and then integrates every four feature images among the input feature images into a feature image with a resolution which is four times the resolution of a feature image from the third level of first convolutional neural network circuit, that is, the 32 input feature images pass the multiplexer, and then 8 feature images are output to the next level (the fifth level) of second convolutional neural network circuit.

The fifth level of second convolutional neural network circuit includes four convolution layers, the first two convolution layers each include eight filter circuits, the third convolution layer include four filter circuits, the fourth convolution layer includes one filter circuit, and each filter circuit includes a number of 3*3 filters, where the filter at the position [1, 1] is defined as a central pixel. After the image of the input signal passes the first convolution layer, eight feature images are generated and output to the second convolution layer; after the feature images pass the second convolution layer, eight feature images are generated and input to the third convolution layer; after the feature images pass the third convolution layer, four feature images are generated and input to the fourth convolution layer; and the fourth convolution layer outputs one feature image to the output terminal of the apparatus for upscaling an image.

Figure 3:
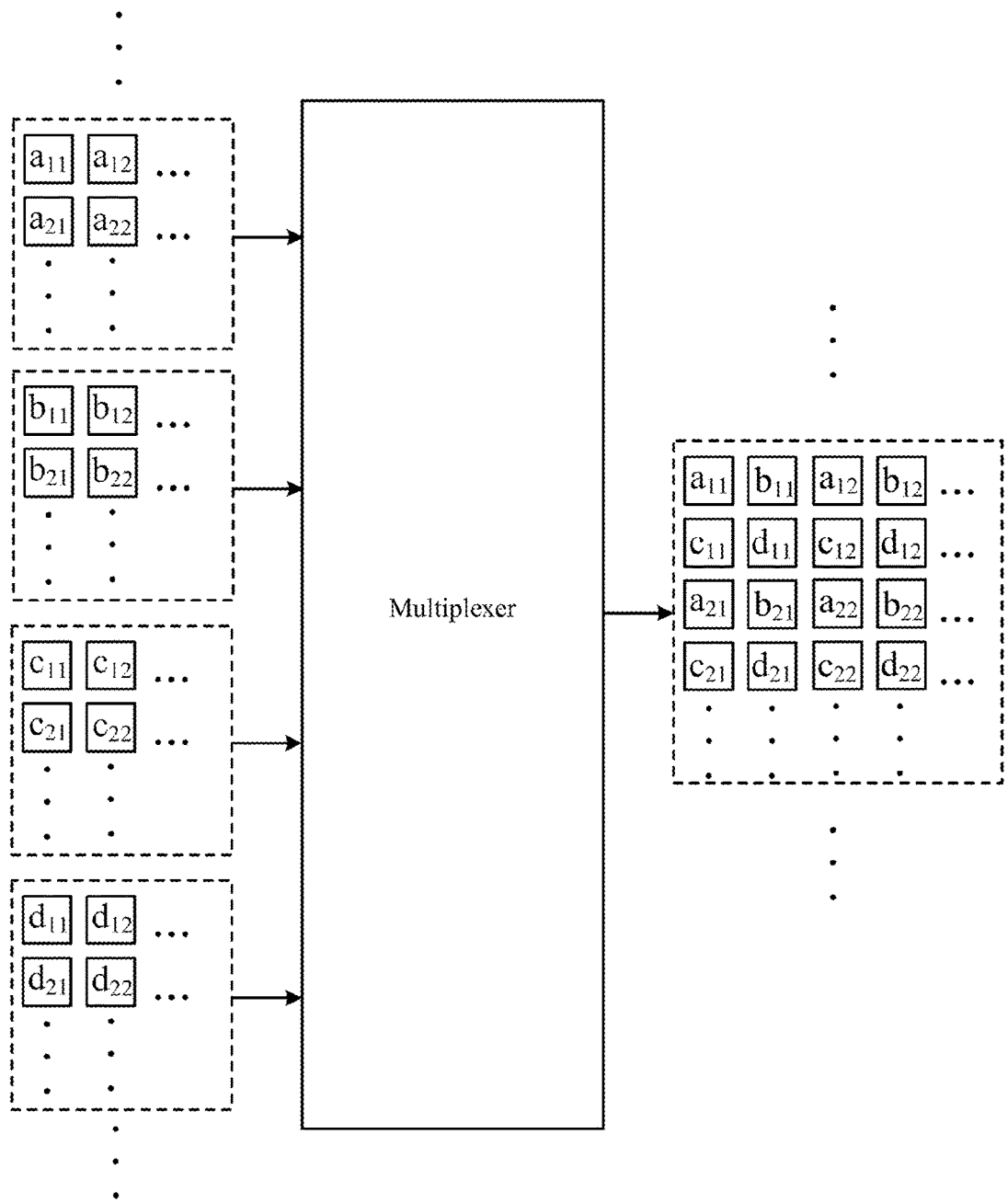
FIG. 3 is an upscaling schematic diagram of an multiplexer in an apparatus for upscaling an image according to an embodiment of the disclosure.

In the process above, each multiplexer is essentially equivalent to an adaptive interpolation filter, as illustrated in FIG. 3, configured to interleave pixel values in a group of every four feature images among the input feature images into a feature image including the pixels, the number of which is four times the number of pixels in an input feature image. As illustrated in FIG. 3, the multiplexer operates under such a principle that the pixel values at the respective same pixel positions in the four input feature images are arranged in a matrix, and recorded in the feature image to be output, so information of none of the pixels in the feature images will be modified (lost or added to) in the upscaling process.

In the process above, both the first convolutional neural network circuit and the second convolutional neural network circuit can be regarded as a neural network structure to which an image is input, and from which an image is output, each neural network structure includes a plurality of convolution layers, and each convolution layer includes a plurality of filters. An operating principle thereof will be described below in brief taking a neural network structure including two convolution layers in FIG. 4 as an example.

Figure 4:
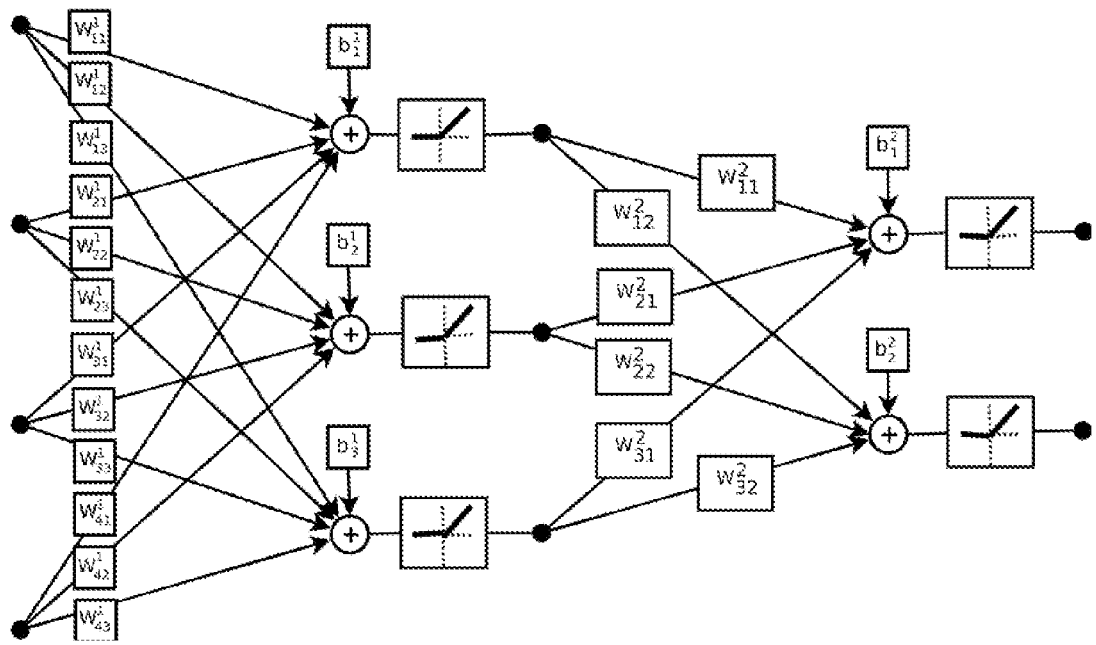
FIG. 4 is a schematic structural diagram of a convolutional neural network circuit in an apparatus for upscaling an image according to an embodiment of the disclosure.

There are four input images on the left of FIG. 4, and after they pass respective filters at the first convolution layer, three feature images are generated; and after the feature images pass the second convolution layer, two feature images are output, where each frame labeled with a scalar weight $W_{ij}^k$ is equivalent to a filter (e.g., a filter with a 3×3 or 5×5 kernel), and a bias $b_i^k$ represents an image increment to be added to a convolution output; and k represents the sequence number of a convolution layer, and i and j represent the sequence number of an input image, and the sequence number of an output image respectively.

Figure 5:
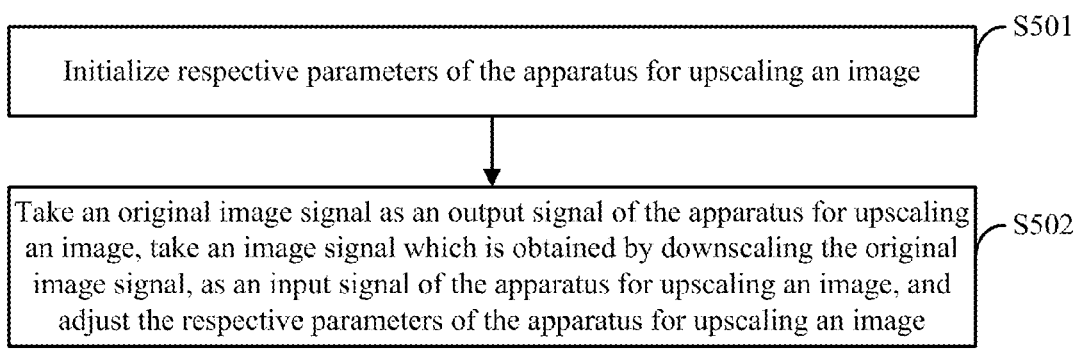
FIG. 5 is a schematic flow chart of a method for training an apparatus for upscaling an image according to an embodiment of the disclosure.

The values of the scalar weight $W_{ij}^k$ and the bias $b_i^k$ are fixed while the apparatus is operating, and before the apparatus is put into operation, the apparatus needs to be trained using a series of standard input and output images, and adjusted to some optimization criterion using an application, so the apparatus above for upscaling an image according to the embodiment of the disclosure needs to be subjected to a series of training before it is put into operation, and based upon the same inventive idea, an embodiment of the disclosure further provides a method for training the apparatus above for upscaling an image, as illustrated in FIG. 5, where the method includes the following operations.

The operation S501 is to initialize respective parameters of the apparatus for upscaling an image, where since there is no parameter introduced of a multiplexer, the respective parameters of the apparatus for upscaling an image are actually parameters of all the convolutional neural network circuits.

The operation S502 is to take an original image signal as an output signal of the apparatus for upscaling an image, to take an image signal which is obtained by downscaling the original image signal, as an input signal of the apparatus for upscaling an image, and to adjust the respective parameters of the apparatus for upscaling an image so that an image signal which is obtained by upscaling the downscaled image signal via the respective adjusted parameters is the same as the original image signal; and thereafter to upscale a low-resolution image using the respective adjusted parameters as upscaling parameters of the upscaling apparatus.

Here the respective parameters of the apparatus for upscaling an image can be initialized in the operation S501 as done in the traditional initialization scheme by setting the weights $W_{ij}$ of the respective filter circuits at the respective convolution layers of all the convolutional neural network circuits to a small random number, and initializing all the biases to 0. This traditional initialization scheme can be applicable as appropriate to upscaling by a small factor of e.g., 2×, etc., but may not be applicable as appropriate to upscaling by a large factor of e.g., 4×, etc., using a plurality of convolutional neural network circuits, so the respective parameters in the apparatus for upscaling an image can be further initialized in the training method above according to the embodiment of the disclosure in the following two new schemes.

In a first scheme, the bias of each filter circuit is initialized to 0; and the weight $W_{ij}$ of each filter circuit at each convolution layer of each first and second convolutional neural network circuit in the apparatus for upscaling an image is initialized in the equation of:

$$W_{ij} = \left\{ \begin{array}{ll} 1/(m) & (i,j) \text{ represents a set anchor pixel} \\ 0 & \text{other pixels} \end{array} \right\};$$

where m represents the number of feature images input to a corresponding filter circuit.

In a second scheme, the bias of each filter circuit is initialized to 0; and the weight $W_{ij}$ of each filter circuit at each convolution layer of each first and second convolutional neural network circuit in the apparatus for upscaling an image is initialized in the equation of:

$$W_{ij} = W'_{ij} + \frac{\text{uniform}(-1,1)}{\sqrt{m}}, \text{ and}$$

$$W'_{ij} = \left\{ \begin{array}{ll} 1/(m) & (i,j) \text{ represents a set anchor pixel} \\ 0 & \text{other pixels} \end{array} \right\};$$

where m represents the number of feature images input to a corresponding filter circuit; and uniform (−1, 1) represents a random number selected from the interval of (−1, 1).

In the second initialization scheme, a small noise value which is uniformly distributed is added to the weights $W_{ij}$ of the respective filter circuits as compared with the first initialization scheme, thus enabling the apparatus for upscaling an image to recognize noise after being trained.

Based upon the same inventive idea, an embodiment of the disclosure further provides a method for upscaling an image using the apparatus above for upscaling an image, and since the method addresses the problem under a similar principle to the apparatus above for upscaling an image, reference can be made to the implementation of the apparatus for an implementation of the method, so a repeated description thereof will be omitted here.

An embodiment of the disclosure provides a method for upscaling an image using the apparatus for upscaling an image, where the method includes the following operations.

Each first convolutional neural network circuit converts an image of an input signal input to the first convolutional neural network circuit into a plurality of feature images with specific features, and outputs the feature images.

Each multiplexer integrates every n*n feature images among feature images of an input signal input to the multiplexer into a feature image with a resolution which is n times a resolution of a feature image of the input signal input to the multiplexer, and outputs the feature image, where the number of feature images of the input signal input to the multiplexer is a multiple of n*n, and n is an integer greater than 1.

In some embodiments, where there are a plurality of multiplexers in the apparatus, each multiplexer receives and then upscales the feature images, and then outputs the feature images to the next multiplexer, and the next multiplexer upscales the received feature images until the last multiplexer outputs a final image as a result of upscaling.

The apparatus for upscaling an image according to the embodiment of the disclosure can be embodied as a set of Central Processing Units (CPUs), or can be embodied as a set of Graphic Processing Units (GPUs), or can be embodied as a Field Programmable Gate Array (FPGA).

Based upon the same inventive idea, an embodiment of the disclosure further provides a display device including the apparatus above for upscaling an image according to the embodiment of the disclosure. The display device can be a mobile phone, a tablet computer, a TV set, a display, a notebook computer, a digital photo frame, a navigator, a wearable device, or any other product or component capable of displaying. Reference can be made to the embodiment of the apparatus above for upscaling an image for an implementation of the display device, so a repeated description thereof will be omitted here.

In the apparatus for upscaling an image, the method for training the same, and the method for upscaling an image according to the embodiments of the disclosure, the convolutional neural network circuit obtains the feature images of the image, the multiplexer upscales the image by integrating every n*n feature images of the input signal into a feature image with a resolution which is n times the resolution of a feature image of the image, and the multiplexer upscales the image by recording information of the respective feature images of the input signal into the generated feature image without losing any information, so after the image passes one multiplexer with an upscaling factor n, the resolution of the image can be improved by a factor n. Furthermore more than one multiplexer can be arranged in the apparatus for upscaling an image to upscale the image sequentially, and each multiplexer can perform the function of upscaling the image by a separate factor, so that the apparatus can adjust the upscaling factor flexibly as needed, thus resulting in an upscaling apparatus applicable with a variety of upscaling factors. Furthermore since each multiplexer reduces the number of feature images to be output by the multiplexer, while improving the resolution of the feature image by a factor n, the size of an input signal to the next level of multiplexer or the next level of the first convolutional neural network circuit connected in cascade therewith can be reduced to thereby reduce the number of upscaling operations.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. An apparatus for upscaling an image, comprising: at least one first convolutional neural network circuit and at least one multiplexer, which are connected in cascade, wherein:
   one of the at least one first convolutional neural network circuit is located at a first level of the apparatus for upscaling an image, and a signal input terminal of the first convolutional neural network circuit located at the first level of the apparatus for upscaling an image is served as a signal input terminal of the apparatus for upscaling an image; one of the at least one multiplexer is located at a last level of the apparatus for upscaling an image, and a signal output terminal of the multiplexer located at the last level of the apparatus for upscaling an image is served as a signal output terminal of the apparatus for upscaling an image; and each multiplexer has a signal input terminal connected with a signal output terminal of one of the at least one first convolutional neural network circuit, or with a signal output terminal of another multiplexer;
   each first convolutional neural network circuit is configured to convert an image of an input signal input to the first convolutional neural network circuit into a plurality of feature images, and to output the feature images; and
   each multiplexer is configured to integrate every n*n feature images among feature images of an input signal input to the multiplexer into a feature image with a resolution which is n times a resolution of a feature image of the input signal input to the multiplexer, and to output the feature image, wherein a number of feature images of the input signal input to the multiplexer is a multiple of n*n, and n is an integer greater than 1;
   wherein the apparatus for upscaling an image further comprises a second convolutional neural network circuit, wherein a signal input terminal of the second convolutional neural network circuit is connected with the signal output terminal of the multiplexer located at the last level of the apparatus for upscaling an image, and a signal output terminal of the second convolutional neural network circuit is served as the signal output terminal of the apparatus for upscaling an image; and
   the second convolutional neural network circuit is configured to optimize a feature image of an output signal of the multiplexer located at the last level of the apparatus for upscaling an image.

2. The apparatus for upscaling an image according to claim 1, wherein there are two or three multiplexers in the apparatus for upscaling an image.

3. The apparatus for upscaling an image according to claim 2, wherein a signal input terminal of each multiplexer is connected with a signal output terminal of one of the at least one first convolutional neural network circuit.

4. The apparatus for upscaling an image according to claim 1, wherein when there are a plurality of multiplexers, upscaling factors of respective multiplexers are same.

5. The apparatus for upscaling an image according to claim 1, wherein each multiplexer is a multiplexer with an upscaling factor of a prime number.

6. The apparatus for upscaling an image according to claim 5, wherein each multiplexer is a multiplexer with an upscaling factor of 2.

7. The apparatus for upscaling an image according to claim 1, wherein each multiplexer is an adaptive interpolation filter.

8. The apparatus for upscaling an image according to claim 1, wherein each convolutional neural network circuit of the at least one first convolutional neural network circuit and the second convolutional neural network circuit comprises at least one convolution layer comprising a plurality of filter circuits.

9. A method for training the apparatus for upscaling an image according to claim 1, the method comprising:
   initializing respective parameters of the apparatus for upscaling an image; and
   taking an original image signal as an output signal of the apparatus for upscaling an image, taking an image signal which is obtained by downscaling the original image signal, as an input signal of the apparatus for upscaling an image, and adjusting the respective parameters of the apparatus for upscaling an image so that an image signal which is obtained by upscaling the downscaled image signal via respective adjusted parameters is same as the original image signal.

10. The training method according to claim 9, wherein initializing the respective parameters of the apparatus for upscaling an image comprises:
   initializing a weight $W_{ij}$ of each filter circuit at each convolution layer of each first and second convolutional neural network circuit in the apparatus for upscaling an image in an equation of:

$$W_{ij} = \begin{cases} 1/(m) & (i, j) \text{ represents a set anchor pixel} \\ 0 & \text{other pixels} \end{cases};$$

wherein m represents a number of feature images input to a corresponding filter circuit; and
   initializing a bias of each filter circuit to 0.

11. The training method according to claim 9, wherein initializing the respective parameters of the apparatus for upscaling an image comprises:
   initializing a weight $W_{ij}$ of each filter circuit at each convolution layer of each first and second convolutional neural network circuit in the apparatus for upscaling an image in an equation of:

$$W_{ij} = W'_{ij} + \frac{\text{uniform}(-1, 1)}{\sqrt{m}}, \text{ and}$$

$$W'_{ij} = \begin{cases} 1/(m) & (i, j) \text{ represents a set anchor pixel} \\ 0 & \text{other pixels} \end{cases};$$

wherein m represents a number of feature images input to a corresponding filter circuit; and uniform (−1, 1) represents a random number selected from an interval of (−1, 1); and
   initializing a bias of each filter circuit to 0.

12. A method for upscaling an image using the apparatus for upscaling an image according to claim 1, the method comprising:
   converting, by each first convolutional neural network circuit, an image of an input signal input to the first convolutional neural network circuit into a plurality of feature images, and outputting the feature images; and
   integrating, by each multiplexer, every n*n feature images among feature images of an input signal input to the multiplexer into a feature image with a resolution which is n times a resolution of a feature image of the input signal input to the multiplexer, and outputting the feature image, wherein a number of feature images of the input signal input to the multiplexer is a multiple of n*n, and n is an integer greater than 1.

13. A display device, comprising an apparatus for upscaling an image, the apparatus for upscaling an image comprising at least one first convolutional neural network circuit and at least one multiplexer, which are connected in cascade, wherein:
   one of the at least one first convolutional neural network circuit is located at a first level of the apparatus for upscaling an image, and a signal input terminal of the first convolutional neural network circuit located at the first level of the apparatus for upscaling an image is served as a signal input terminal of the apparatus for upscaling an image; one of the at least one multiplexer is located at a last level of the apparatus for upscaling an image, and a signal output terminal of the multiplexer located at the last level of the apparatus for upscaling an image is served as a signal output terminal of the apparatus for upscaling an image; and each multiplexer has a signal input terminal connected with a signal output terminal of one of the at least one first convolutional neural network circuit, or with a signal output terminal of another multiplexer;
   each first convolutional neural network circuit is configured to convert an image of an input signal input to the first convolutional neural network circuit into a plurality of feature images, and to output the feature images; and
   each multiplexer is configured to integrate every n*n feature images among feature images of an input signal input to the multiplexer into a feature image with a resolution which is n times a resolution of a feature image of the input signal input to the multiplexer, and to output the feature image, wherein a number of feature images of the input signal input to the multiplexer is a multiple of n*n, and n is an integer greater than 1;
   wherein the apparatus for upscaling an image further comprises a second convolutional neural network circuit, wherein a signal input terminal of the second convolutional neural network circuit is connected with the signal output terminal of the multiplexer located at the last level of the apparatus for upscaling an image, and a signal output terminal of the second convolutional neural network circuit is served as the signal output terminal of the apparatus for upscaling an image; and
   the second convolutional neural network circuit is configured to optimize a feature image of an output signal of the multiplexer located at the last level of the apparatus for upscaling an image.

14. The display device according to claim 13, wherein there are two or three multiplexers in the apparatus for upscaling an image.

15. The display device according to claim 14, wherein a signal input terminal of each multiplexer is connected with a signal output terminal of one of the at least one first convolutional neural network circuit.

16. The display device according to claim 13, wherein when there are a plurality of multiplexers, upscaling factors of respective multiplexers are same.

17. The display device according to claim 13, wherein each multiplexer is a multiplexer with an upscaling factor of a prime number.

18. The display device according to claim 13, wherein each multiplexer is an adaptive interpolation filter.

* * * * *